US009376168B2

(12) United States Patent
Rohden (10) Patent No.: US 9,376,168 B2
(45) Date of Patent: Jun. 28, 2016

(54) SHIP HAVING AN OPENING FOR REMOVING A POWER SUPPLY SYSTEM

(75) Inventor: Rolf Rohden, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 250 days.

(21) Appl. No.: 13/823,622

(22) PCT Filed: Sep. 8, 2011

(86) PCT No.: PCT/EP2011/065528
§ 371 (c)(1),
(2), (4) Date: Jun. 4, 2013

(87) PCT Pub. No.: WO2012/034920
PCT Pub. Date: Mar. 22, 2012

(65) Prior Publication Data
US 2013/0260620 A1 Oct. 3, 2013

(30) Foreign Application Priority Data
Sep. 16, 2010 (DE) .......................... 10 2010 040 904

(51) Int. Cl.
*B63B 3/54* (2006.01)
*B63H 21/30* (2006.01)
*B63J 3/02* (2006.01)
*B63H 9/02* (2006.01)
*B63H 21/17* (2006.01)
(Continued)

(52) U.S. Cl.
CPC .. *B63B 3/54* (2013.01); *B63H 9/02* (2013.01); *B63H 21/17* (2013.01); *B63H 21/21* (2013.01); *B63H 21/30* (2013.01); *B63J 3/02* (2013.01); *G06Q 10/20* (2013.01)

(58) Field of Classification Search
CPC ... B63H 2001/005; B63H 21/21; G06Q 10/20
USPC .................. 440/6, 3; 705/7.22; 700/286–298
See application file for complete search history.

(56) References Cited

U.S. PATENT DOCUMENTS 3,602,730 A    8/1971   Cushing
4,602,584 A *   7/1986   North et al. .................. 114/39.3
(Continued)

FOREIGN PATENT DOCUMENTS

AU   199952638 B2   2/2000
CN   85 1 05039 A   9/1986
(Continued)

OTHER PUBLICATIONS

Harrington, "Marine Engineering", Society of Naval Architects and Marine ENgineers, 1982, p. 138.*
(Continued)

*Primary Examiner* — Andrew Polay
(74) *Attorney, Agent, or Firm* — Seed Intellectual Property Law Group PLLC (57) ABSTRACT

The invention relates to a ship, in particular a cargo ship, having a power supply system. The invention relates in particular to a ship having a plurality of diesel electric systems for providing electrical power that are disposed within the ship, wherein a plurality of diesel electric systems are each associated with a common opening for removing the diesel electric systems. The invention further relates to a power supply system for a ship and to a method for controlling the power supply system of a ship.

8 Claims, 5 Drawing Sheets

(51) Int. Cl.
 *B63H 21/21* (2006.01)
 *G06Q 10/00* (2012.01)

(56) References Cited

U.S. PATENT DOCUMENTS

| | | | |
|---|---|---|---|
| 4,678,439 A | | 7/1987 | Schlichthorst |
| 6,592,412 B1 | | 7/2003 | Geil et al. |
| 7,185,599 B1 | | 3/2007 | Griffiths et al. |
| 7,533,622 B1 | | 5/2009 | Jaszewski et al. |
| 8,601,964 B2 | | 12/2013 | Rohden |
| 2007/0233364 A1 | | 10/2007 | Kumar |
| 2009/0156068 A1* | | 6/2009 | Barrett et al. ............ 440/3 |
| 2012/0166249 A1* | | 6/2012 | Jackson ............ 705/7.28 |

FOREIGN PATENT DOCUMENTS

| | | |
|---|---|---|
| CN | 101198516 A | 6/2008 |
| DE | 3426333 A1 | 1/1986 |
| DE | 102005028447 A1 | 12/2006 |
| EP | 2 218 637 A1 | 8/2010 |
| EP | 2243699 A1 | 10/2010 |
| GB | 2 046 689 A | 11/1980 |
| GB | 2 161 773 A | 1/1986 |
| GB | 2311502 A | 1/1997 |
| JP | 63-15635 A | 1/1988 |
| JP | 01-091624 A | 4/1989 |
| JP | 4100799 A | 4/1992 |
| JP | 07-010071 A | 1/1995 |
| JP | 07-010072 A | 1/1995 |
| JP | 2005304263 A | 10/2005 |
| JP | 2005-354861 A | 12/2005 |
| JP | 2007325460 A | 12/2007 |
| JP | 2008-024187 A | 2/2008 |
| JP | 2008-543641 A | 12/2008 |
| KR | 10-2008-0081200 A | 9/2008 |
| TW | 200946401 A | 11/2009 |
| WO | 00/06450 A1 | 2/2000 |
| WO | 2006/133950 A2 | 12/2006 |
| WO | 2011/127987 A1 | 10/2011 |

OTHER PUBLICATIONS

Behrens, R., "Wartungskonzept für moderne Dieselmotoren Maintenance Concept for Modern Diesel Engines" from the Handbuch der Werften, Prof Dr-Ing H Keil, Oct. 15, 1998, pp. 279-287.

* cited by examiner

SHIP HAVING AN OPENING FOR REMOVING A POWER SUPPLY SYSTEM

BACKGROUND

1. Technical Field

The present invention concerns a ship, in particular a cargo ship, having an energy supply system. The invention further concerns an energy supply system for a ship, in particular a cargo ship. The invention further concerns a method of controlling an energy supply system of a ship.

2. Description of the Related Art

Ships of the aforementioned kind usually take electrical energy from an on-board energy supply system. In known ships the energy supply system has one or more diesel-electric systems which convert a mechanically produced power into electrical energy. The expression diesel-electric system is used to denote a system which is adapted to generate electrical energy and which has a (diesel) internal combustion engine for producing mechanical power, coupled to a generator for generating electrical energy.

On ships of the kind set forth in the opening part of this specification the on-board network, communication devices, auxiliary or main drives are supplied with electrical energy by means of the energy supply system.

DE 10 2005 028 447 to the present applicant discloses a ship having a screw body driven by an electric motor and electrically driven transverse thruster rudders. In addition that publication provides a plurality of Magnus rotors on the ship, which additionally provide drive force and are also driven by means of electric motors. Magnus rotors are also referred to as Flettner rotors or sailing rotors.

As further general state of the art attention is to be directed to DE 34 26 333 C2, JP 04100799 A, U.S. Pat. No. 3,602,730, WO 00/06450 A1, GB 2 311 502 A and EP 2 243 699 A1, and the article 'Wartungskonzept für moderne Dieselmotoren' from the Handbuch der Werften, Prof Dr-Ing H Keil, 1998, pages 279-280.

The provision of a reliably operating energy supply is of great significance for operation of a ship of the kind set forth in the opening part of this specification. By virtue of continuous use the diesel-electric systems are subjected to wear which cannot be avoided and, after a given operating time has been reached, have to be regularly maintained. While maintenance operations are being performed either operation of the ship is severely impaired or (generally) it is not possible as the ship must be in a shipyard or at any event a port in order to be maintained. If minor maintenance operations are to be carried out, they can admittedly be performed on board the ship and under some circumstances even while a ship is sailing. It will be noted however that in such cases a maintenance crew must also be carried on board, and that also causes significant costs.

The maintenance complication and expenditure to be incurred in relation to known ships is found to be a disadvantage in the state of the art.

BRIEF SUMMARY

According to one embodiment of the invention has a plurality of diesel-electric systems for providing electrical energy, wherein associated with a plurality of diesel-electric systems is a respective common opening for removal of the diesel-electric systems.

The present invention is based on the realization that the maintenance can be carried out in a way which saves the most time and cost, insofar as both the laid-up time in a port and also the assembly time required to replace components that are in need of maintenance is reduced as far as possible. That is achieved if no maintenance operations have to be carried out in port and while the ship is sailing, but components which are in need of maintenance can be replaced as quickly as possible by fresh or already maintained components, when reaching a port. The present invention makes that possible precisely by virtue of the fact that it respectively associates with a plurality of diesel-electric systems, one or more common openings, through which the diesel-electric systems can be replaced, economically in respect of time. Installation and removal operations are only limitedly possible on the ship which, in the interior, affords only extremely limited space for arranging functional elements, in order to make the best possible use of the load-carrying volume. Advantageously providing an opening, preferably in a ceiling portion above the diesel-electric systems, means that those of the diesel-electric systems, that are in need of maintenance, can however be efficiently replaced through that opening.

Preferably the common opening or common openings can be closed by means of a cover plate and extend through the ceiling above the diesel-electric systems. Further preferably a plurality of diesel-electric systems are respectively arranged in a common room, for example the engine room, with which the common opening is associated. The common room is preferably disposed beneath the hold, wherein the floor of the hold corresponds to the ceiling of the room containing the diesel-electric systems. Preferably a plurality of groups of diesel-electric systems are distributed in rooms over the ship, to achieve a more uniform distribution of mass. Preferably the rooms are arranged in the forecastle to provide a counter-weight to a drive for the ship's screw, which is arranged astern. Another particular advantage of the present invention also lies in the use of a plurality of diesel-electric systems in the energy supply system. If it is assumed that a given amount of energy is required on board a ship, it has hitherto been assumed in the case of known ships that it is most economical to design as few diesel-electric systems as possible, of the highest power output as possible, with large-size engines, to meet the anticipated situation in respect of power requirement, and to fit such large systems in the ship. The maintainability of a ship in accordance with the invention however is particularly advantageously influenced by virtue of the fact that, instead of as few large assemblies as possible, there is provided a plurality of smaller diesel-electric systems which can be respectively removed through the opening associated therewith, at a much lower level of complication and expenditure, for external maintenance operations. That is not possible in the case of a ship with only one or possibly a few large-scale systems.

The diesel-electric systems are movable within the ship between an operating position and a mounting/removal position beneath the common opening. The mobility of the diesel-electric systems between an operating position and a mounting/removal position means on the one hand that the utilization of space is improved within the room in which the diesel-electric systems are respectively arranged, for more easily passing through the room while the ship is moving or outside of an operation for replacing one or more diesel-electric systems. On the other hand, the time required for changing one or more diesel-electric systems can be still further reduced insofar as the diesel-electric system is already moved out of an operating position into the mounting/removal position before the beginning of the actual replacement operation, through the common opening. In that respect it is particularly advantageous that a plurality of diesel-electric systems is provided on board the ship. The number of diesel-electric systems is preferably so selected that not all diesel-electric systems of the ship are constantly in operation so that shutting down a diesel-electric system and moving it out of the operating position into the mounting/removal position can be compensated by the other diesel-electric systems. Moving the diesel-electric system from the operating position into the mounting/removal position makes it possible to prepare for the rapid replacement through the common opening, that is to say to already prepare for that operation before reaching a port in which the replacement operation is to be effected. Preferably there are three or more diesel-electric systems, particularly preferably six or more diesel-electric systems.

In a preferred embodiment the diesel-electric systems are displaceable by means of displacement means, preferably rails. The provision of displacement means make it possible to ensure that the diesel-electric systems are not moved in a free movement between the operating position and the mounting/removal position, but that such movement takes place along a defined and preferably guided path. That facilitates on the one hand positioning of the diesel-electric systems in the operating or mounting/removal position, and in addition reduces the risk of damage and/or injury to surrounding components or any operators during the movement of the diesel-electric systems.

As an alternative to a rail configuration, rollers or other sliding portions can be provided as the displacement means. The displacement means can preferably also include machine support of the movement, from one position into the other, for example hydraulic drives or pneumatic drives or block-and-tackle arrangements.

In a further preferred embodiment the ship has removable floor panels arranged above the displacement means. The floor panels are adapted to make it possible to go into the room in which the generators are arranged. At the same time the floor panels prevent operators being able to stumble over or damage the displacement means. The floor panels can be of such a configuration that displacement or movement of the diesel-electric systems by means of the displacement means is first made possible when the floor panels have been removed, thereby further increasing the aspect of passive safety.

The diesel-electric systems can preferably be arrested in the operating position. Arresting is preferably effected by means of screwing or latching. Such arresting means are particularly preferably provided in addition to the floor panels for arresting the diesel-electric systems, also in order to limit or prevent possible damage to the floor panels by unintentionally moving the diesel-electric systems relative to the floor panels.

In a preferred embodiment the ship according to the invention further has a ship crane adapted to remove at least one of the diesel-electric systems from the interior of the ship through the common opening and/or to introduce it into the interior of the ship. The ship crane is preferably arranged in such a way that, by letting down the crane hook through the hold and through the common opening, it projects into the room in which the diesel-electric systems are arranged. Accordingly the ship crane makes it possible to effect replacement of diesel-electric systems in any port or at any berth, irrespective of whether a crane is or is not available on the shore. The crane is preferably also capable of lifting or lowering an optional cover for the common opening. Particularly preferably, in a ship having a ship crane and a common opening, the mounting/removal position for the diesel-electric systems is directly beneath the common opening so that the crane can be brought into engagement with the diesel-electric system or preferably a fitment of the diesel-electric system, without lateral pivotal movement of the crane hook out of the vertical position. That promotes an exclusively vertical movement of the diesel-electric system during the replacement procedure.

In a further preferred embodiment the ship according to the invention has a control unit which is associated with the energy supply system and which is adapted in dependence on a predetermined energy requirement to switch on and shut down individual ones or a plurality of the diesel-electric systems. The energy requirement on board a ship sometimes changes considerably at different moments in time in dependence on the respective energy requirement. If it were not possible to vary the energy requirement, to adapt it to the prevailing situation, it would be necessary to always provide comparatively large energy reserves, and that results in an increased fuel consumption. With that background in mind, it is particularly advantageous to provide a control unit which monitors the energy requirement and switches on further diesel-electric systems or switches off redundant diesel-electric systems, according to the situation involved, in order to ensure at any time an optimum energy requirement and consumption (by the diesel-electric systems).

The control unit is preferably adapted to detect the number of operating hours of each diesel-electric system. The number of operating hours of a diesel-electric system is an important parameter for determining a maintenance period or for finding out whether the diesel-electric system is or is not in need of maintenance. The control unit is preferably adapted to not switch on a diesel-electric system when its number of operating hours has reached a critical value indicating a need for maintenance. The control unit is preferably adapted to select which diesel-electric system is to be switched on, among the remaining diesel-electric systems, in place of such a system that is in need of maintenance.

Further preferably the control unit is adapted to make a selection in respect of switching on and shutting down individual diesel-electric systems in dependence on the respectively detected operating hours, in such a way that a difference, which is preferably respectively uniform, is maintained between the diesel-electric systems, in respect of the number of operating hours. It has proven to be particularly advantageous not to use the diesel-electric systems as uniformly as possible, but instead to maintain an intentional 'inequality of distribution' of the use of the diesel-electric systems, for the following reason: if all diesel-electric systems in the ship are uniformly loaded, they all reach a critical number of operating hours after a given, equal time and are all in need of maintenance at the same time. Consequently, all diesel-electric systems have to be maintained at times which are close to each other. Therefore, no energy supply is available for the maintenance period and the ship is out of operation. If in contrast however only one diesel-electric system has reached its maintenance date, but the others have not yet done so, then only that one diesel-electric system has to be replaced. Operation of the ship without that one diesel-electric system and only with the other diesel-electric systems is possible and also replacement of the diesel-electric system is possible with a minimum time expenditure, without endangering operation of the ship. Staggering the differences in the number of operating hours of the various diesel-electric systems makes it possible to predict and predetermine the spacings between the maintenance intervals and the replacement operations to be carried out on the diesel-electric systems, with a low level of complication and expenditure. In addition, it is possible in that way to rotate diesel-electric systems, insofar as for example a number of n+x diesel-electric systems is associated with the ship or the energy supply system, wherein n is the number of diesel-electric systems fitted on the ship in the operating position. The x-fold additional diesel-electric systems are respectively maintained externally and are kept in readiness for a replacement operation while the n-fold other diesel-electric systems are in use on the ship.

A ship according to a particularly preferred embodiment of the invention has at least one Magnus rotor which can be rotated by means of electrical energy provided by the energy supply system. The Magnus rotor preferably has a cylindrical rotational body adapted to utilize the Magnus effect. The Magnus effect causes the production of a drive force oriented transversely relative to the direction of a fluid providing an afflux flow to the rotor.

Further preferably the energy supply system is adapted to supply one or more electric motors for driving a ship screw and/or one or more transverse thruster rudders. The energy requirement of the above-mentioned drive systems is high in comparison with the rest of the power requirement of the on-board network so that the reliability and good maintainability is particularly relevant in the case of a ship of such a design configuration.

The invention attains the above-mentioned object in an energy supply system of the kind set forth in the opening part of this specification, in that it has a plurality of diesel-electric systems for providing electrical energy, which can be removed through a common opening of the ship. The common opening for removal of the diesel-electric systems can preferably be closed by means of a cover plate and extends through the deck above the diesel-electric systems. The advantages and features already referred to hereinbefore with reference to the ship according to the invention are applicable to the energy supply system.

The energy supply system is preferably provided with a control unit which includes a unit for detecting the operating hours of the diesel-electric systems of the ship and a unit for identifying a maintenance situation when a diesel-electric system has reached a predetermined number of operating hours. The aforementioned units can have analog or digital instruments and accordingly include analog or digital display means.

The control unit preferably has a unit for predetermining an energy requirement and/or a unit for determining the number of diesel-electric systems on the ship, that is needed for the predetermined energy requirement, and/or a switching unit for switching on and shutting down one or more diesel-electric systems in dependence on the given number of diesel-electric systems required for the predetermined energy requirement and/or in dependence on the respectively detected operating hours, in such a way that a difference, preferably a respective uniform difference, is maintained between the diesel-electric systems, in respect of the numbers of operating hours, or in dependence on a manual selection. The unit for predetermining an energy requirement is preferably adapted to constantly query the actual energy requirement of the on-board network and to provide a signal representative of the energy requirement, as an output signal. The unit for determining the number of diesel-electric systems is preferably adapted, on the basis of the predetermined energy requirement, to identify the required number of diesel-electric systems. Particularly preferably the diesel-electric systems are so selected that they make power available in a respective optimum operating range, and are neither overloaded nor underloaded. The switching unit is adapted to switch on or shut down the corresponding diesel-electric systems, in dependence on the above-mentioned units. Diesel-electric systems which have already reached or exceeded a value in respect of the number of operating hours, that indicates a need for maintenance, are preferably not switched on by the switching unit, but are preferably shut down. The switching unit is preferably also adapted to shut down diesel-electric systems and switch on other diesel-electric systems when a preset difference is to be made (or restored) in respect of the number of operating hours of the different diesel-electric systems. That is preferably also effected independently of a changing input value such as for example the predetermined energy requirement.

An embodiment of the invention includes a method including the steps: detecting the operating hours of the diesel-electric systems of the ship, and identifying a maintenance situation when a diesel-electric system has reached a predetermined number of operating hours.

The method is further developed by one or more of the following steps: ascertaining and/or predetermining an energy requirement, determining the number of diesel-electric systems, that is needed for the predetermined energy requirement, and switching on and shutting down one or more diesel-electric systems in dependence on the given number of diesel-electric systems, that is required for a predetermined energy requirement, and/or in dependence on the respectively detected operating hours, in such a way that a preferably uniform difference is maintained between the diesel-electric systems, in respect of the numbers of operating hours, or in dependence on a manual selection.

BRIEF DESCRIPTION OF THE SEVERAL VIEWS OF THE DRAWINGS

The invention is described in greater detail hereinafter by means of preferred embodiments and with reference to the accompanying Figures in which.

DETAILED DESCRIPTION

Figure 1:
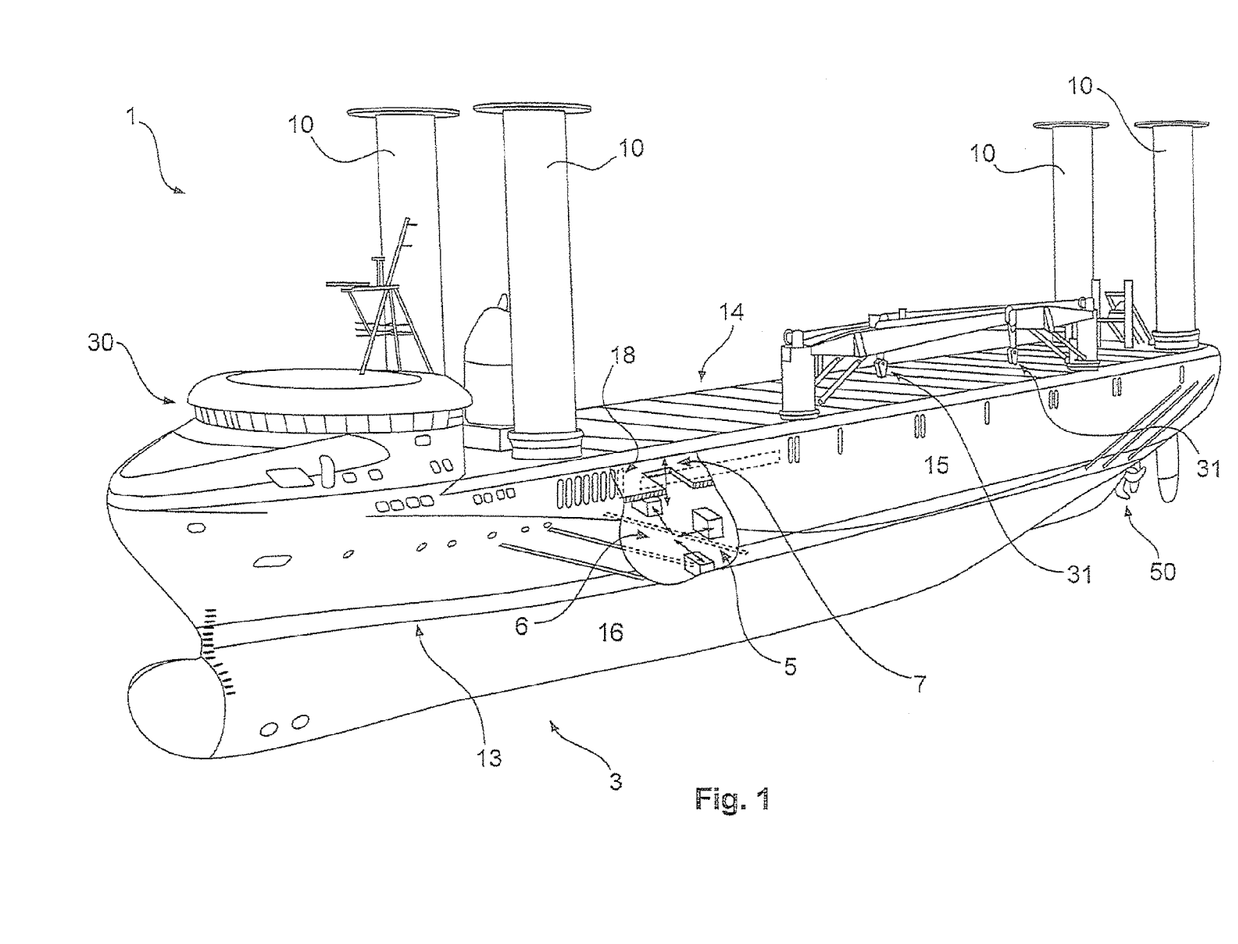
FIG. 1 shows a perspective view of a ship according to the invention.

FIG. 1 shows a diagrammatic view of a ship 1 according to a first embodiment. In this case the ship 1 has a hull comprising an underwater region 16 and an above-water region 15. The ship 1 can further have for example four Magnus rotors or Flettner rotors 10 which can be arranged at the four corners of the hull. The ship 1 has a bridge 30 in the forecastle. The ship 1 has a propeller 50 underwater. For improved maneuverability the ship 1 can also have transverse thruster rudders, wherein preferably one is provided at the stern and one to two transverse thruster rudders are provided at the bow. Preferably those transverse thruster rudders are driven electrically. The bridge 30 and all superstructures above the weather deck 14 are of an aerodynamic configuration to reduce wind resistance. That is achieved in particular by sharp edges and sharp-edged structures being substantially avoided. As few superstructures as possible are provided to reduce wind resistances.

The ship 1 in the first embodiment represents in particular a cargo ship designed especially for transporting wind power installations and components thereof. The transport of wind power installations and their corresponding components can only be limitedly implemented with commercially usual container ships as the components of a wind power installation represent a corresponding need for space which does not correspond to the commercially usual container dimensions while the masses of individual components are low in comparison with the space they need. By way of example mentioned may be made here of rotor blades or pod casings of wind power installations which are predominantly in the form of bulky GRP structures of a few metric tons in weight.

The, for example, four Magnus rotors 10 represent in this case wind-operated drives for the ship 1 according to the invention. It is intended that the ship 1 is basically to be driven with the Magnus rotors and the propeller or the main drive is to be used only for supplementing the drive when the wind conditions are inadequate.

The configuration of the hull of the ship 1 is such that the stern projects as far as possible out of the water. That means on the one hand the height of the stern above the water level but on the other hand also the length of the stern portion which is also suspended above the surface of the water. That configuration serves to detach the water from the hull at an early time to avoid a wave which travels along behind the ship as that leads to a high level of resistance with respect to the hull because that wave caused by the ship 1 is also produced by the machine output power which then however is no longer available to provide forward propulsion.

The bow of the ship is cut off sharply over a relatively long distance. The bottom of the ship, up to a height of about 3 meters above the construction waterline 13, is of a configuration that is optimized with respect to resistance, in regard to hydrodynamic aspects.

Thus the hull of the ship 1 is not designed for maximum load carrying capacity but for minimum resistance (aerodynamic and hydrodynamic).

The superstructures of the ship 1 are of an aerodynamic configuration. That is achieved in particular by all surfaces being in the form of smooth surfaces. The design configuration of the bridge 30 and the superstructures is intended to avoid in particular trailing wake eddies so that actuation of the Magnus rotors can be effected with as little disturbance as possible. The bridge 30 is preferably arranged at the bow of the ship 1. Arranging the superstructures in the middle of the ship 1 is also possible but would unnecessarily impede loading and discharge of the load as the superstructures would thus be arranged precisely over the middle of the hold.

As an alternative thereto the bridge 30 can be arranged at the stern of the ship 1, that however would be found to be disadvantageous insofar as the Magnus rotors 10 would adversely affect a clear view forwardly.

The drive or propulsion of the ship 1 is optimized for a wind drive so that the ship 1 of the present invention is a sailing ship.

The Magnus rotors can be arranged for example in the region of the corners of the holds so that they can define a rectangular area. It should however be pointed out that another arrangement is also possible. The arrangement of the Magnus rotors is based on a notion that a given rotor area is required to achieve the desired drive power by the Magnus rotors. The dimensions of the individual Magnus rotors are reduced by distributing that required surface area to a total of four Magnus rotors. That arrangement of the Magnus rotors provides that a continuous area which is as large as possible remains free, serving in particular for loading and unloading the ship 1 and making it possible to carry a deck load in the form of a plurality of container loads.

The Magnus rotors and the main drive are thus designed in such a way that the main drive, in the event of inadequate wind, only has to provide the difference in power which cannot be delivered by the Magnus rotors. Control of the drive is therefore effected in such a way that the Magnus rotors 10 produce the maximum power or approximately the maximum power. An increase in the power of the Magnus rotors thus directly leads to a fuel saving as no additional energy has to be generated for the electric drive by the main drive. The fuel saving is thus achieved without adaptation being required between a propeller driven by an internal combustion engine or a main drive, and the control of the Magnus rotors.

The ship 1 shown in the Figure, in the region of the forecastle 3, beneath a hold 7, has a plurality of engine rooms 5, of which one is shown in part in a broken-away view in FIG. 1. Arranged in each of the engine rooms are a respective plurality of diesel-electric systems which are together associated with an energy supply system 6.

Figure 2:
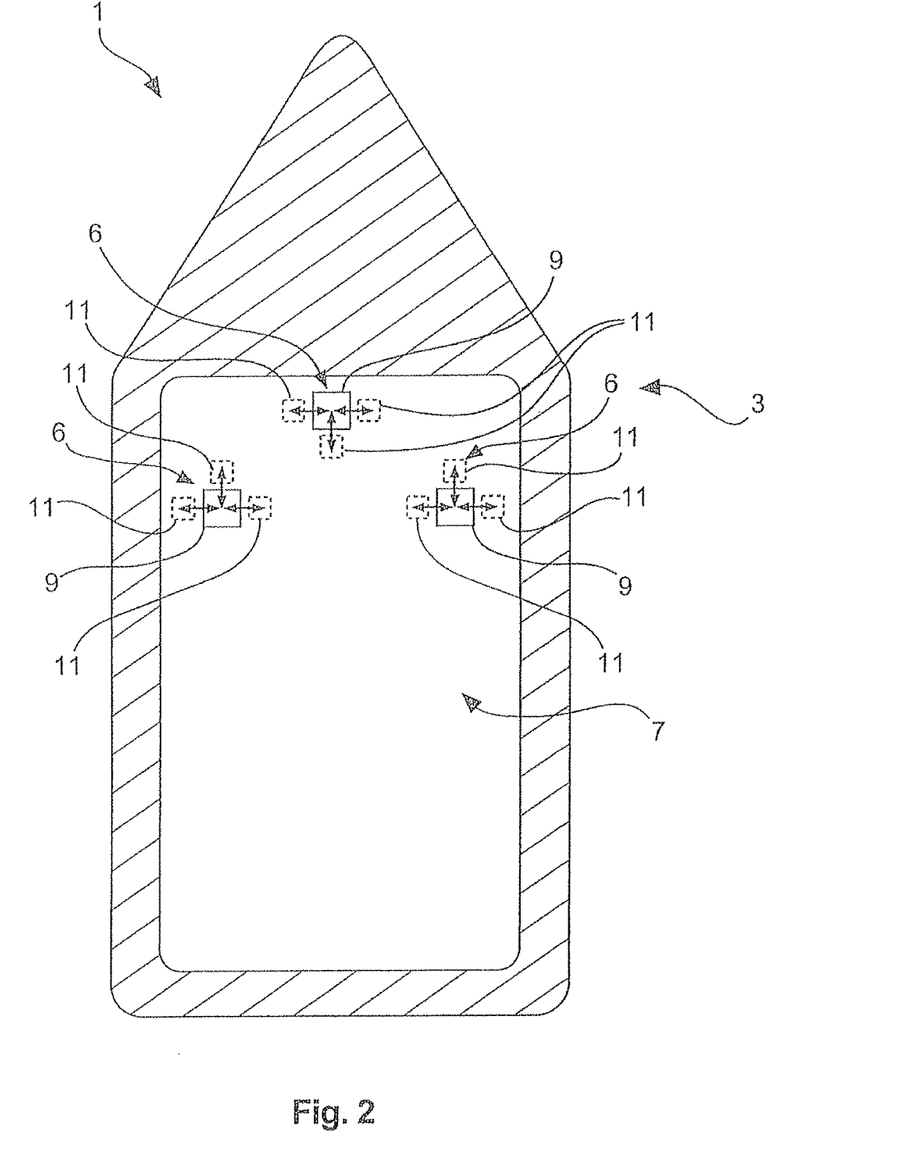
FIG. 2 shows a diagrammatic plan view of the ship of FIG. 1.

FIG. 2 provides more detailed information about the arrangement of the energy supply system 6 in the ship 1. In that respect FIG. 2 shows a diagrammatic cross-sectional view of the ship 1 from above, with a clear view on to the hold 7. Three openings 9 are provided in the region 3 of the forecastle in the hold 7. Disposed beneath the openings 9 are a plurality of diesel-electric systems 11 which are indicated in FIG. 2. Three diesel-electric systems 11 are associated with a respective opening 9 and are each arranged in their own room. All those diesel-electric systems 11 are a component part of the energy supply system 6.

Figure 3:
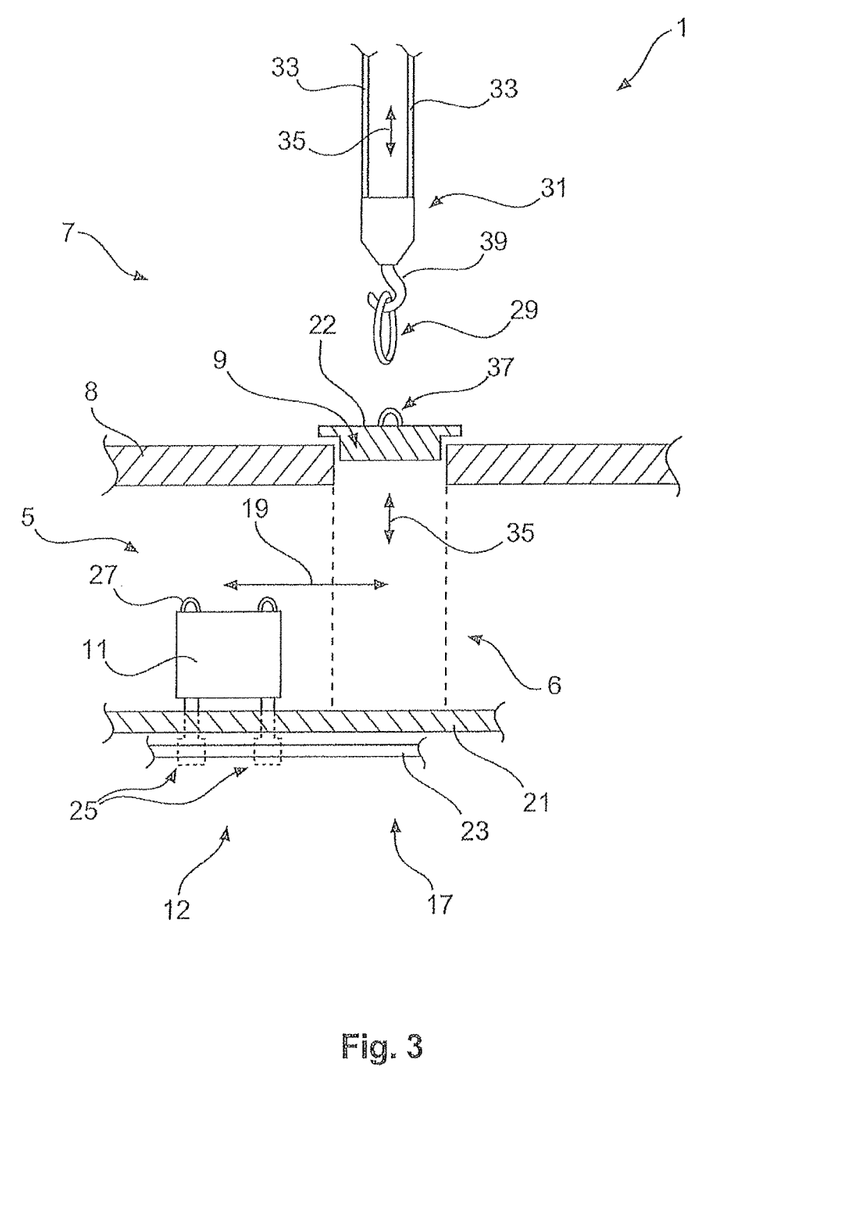
FIG. 3 shows a diagrammatic cross-sectional view from the interior of the ship of FIG. 1.

FIG. 3 shows a diagrammatic cross-sectional view or side view of a room 5 which is in the form of an engine room, beneath the hold 7. The hold 7 and the room 5 therebeneath are separated by a ceiling 8. Provided in the ceiling 8 is an opening 9 which extends completely through the ceiling 8 and which is closed by means of a cover 22.

Arranged within the room 9 is a plurality of diesel-electric systems 11, only one diesel-electric system being shown in FIG. 3. The diesel-electric system is arrested in an operating position 12 by means of fixing elements (not shown). Arranged beneath the diesel-electric system 11 is a plurality of rails 23 serving as displacement means. Arranged between the diesel-electric system 11 and the rails 23 are floor panels 21 which make it possible to enter the room 5 without a disturbing influence in respect of the rails 23. At its top side the diesel-electric system 11 has a plurality of fitments 27 for fitting force transmission means such as for example cables, chains, hooks and so forth.

While the ship is shown in the present case as being provided with four Magnus rotors alternatively numbers and arrangements of Magnus rotors that differ therefrom, and different ways of distributing the drive among the rotors, are also preferably to be provided.

The replacement of a diesel-electric system is described hereinafter with reference to FIG. 3. If it has been determined that the diesel-electric system 11 has reached a number of operating hours indicating a need for maintenance, the diesel-electric system 11 is moved from its operating position 12 into a mounting/removal position 17 in preparation for the exchange operation. For that purpose firstly the floor panels 21 which interfere with the movement of the generator 11 are removed or moved to the side. The diesel-electric system 11 is then brought into contact with the rails 23 in the region of the displacement portions 25. That can be effected by raising or lowering the diesel-electric system 11, for example by means of a block-and-tackle (not shown).

As soon as the diesel-electric system 11 is freed from any fixing means and has been brought into contact with the rails 23 the diesel-electric system 11 is moved from the operating position 12 into the mounting/removal position 17 in the direction of the arrow 19. All this can preferably be prepared and implemented before the ship has reached a port. After the port is reached only the cover 22 still has to be removed from the opening 9 by means of a crane 31. For that purpose the crane 31 has a crane hook 39 on which a fixing means 29 is arranged. The fixing means 29 can be a shackle cable, carrier cable, chain or the like. The crane 31 is moved by means of a block-and-tackle 33 downwardly in the direction of the arrow 35 through the opening 9. The diesel-electric system 11 which is in the mounting/removal position 17 is then brought into contact at the fitments 27 with the force transmission means 29 and lifted also in the direction of the arrow 35 by means of the crane 31. Optionally it is possible to move the diesel-electric system 11 by means of the crane into the interior of the hold 7, from which it is moved away with conventional vehicles, or for the diesel-electric system 11 to be lifted entirely off the ship directly by means of the crane 31. Then if required a new or maintained diesel-electric system 11 is moved into the interior of the ship by means of the crane involving the identical but reversed procedure, and displaced from the mounting/removal position into the operating position 12. The entire system replacement process requires less than an hour.

In the event that replacement of a plurality of diesel-electric systems 11 is necessary the above-described procedure is suitably repeated.

Figure 4:
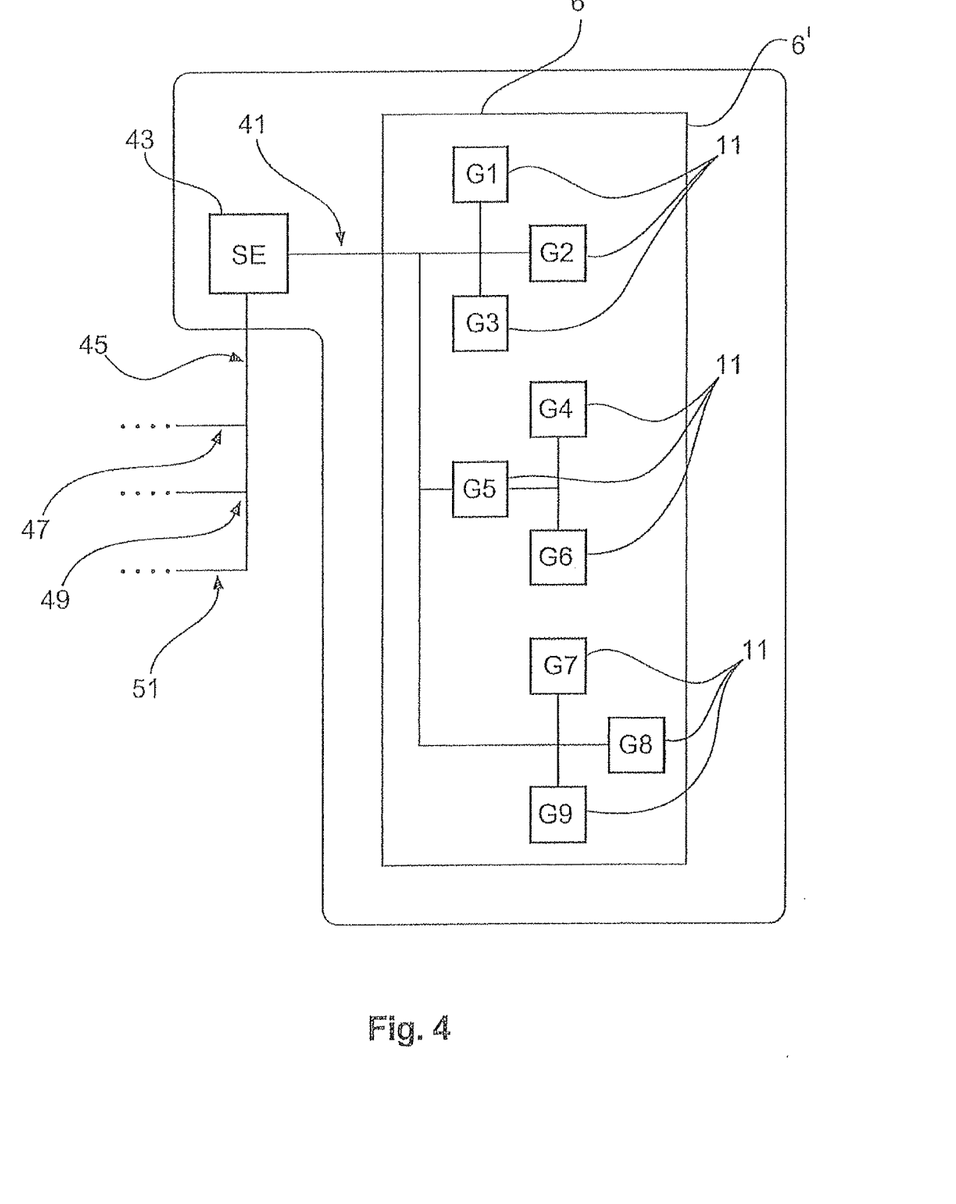
FIG. 4 shows a diagrammatic view of an energy supply system of the ship of FIG. 1.

FIG. 4 systematically shows how the energy supply system 6 according to the invention is integrated into the ship. The energy supply system 6 has an arrangement 6' of diesel-electric systems. The arrangement 6' of diesel-electric systems includes a total of nine generators 11 which are respectively combined in groups each having three generators 11. The arrangement 6' of diesel-electric systems is in communication with a control unit 43 by means of one or more data connecting lines 41. The control unit 43 communicates with the arrangement 6' of diesel-electric systems and if required with each individual generator 11 within the arrangement 6' of diesel-electric systems. The control unit 43 further communicates with an on-board network 45. The on-board network 45 includes the overall electrical power supply for the ship, including the electrical ship drive 47, the drive for a plurality of Magnus rotors 49 and the energy requirement of the general electronic system 51.

Figure 5:
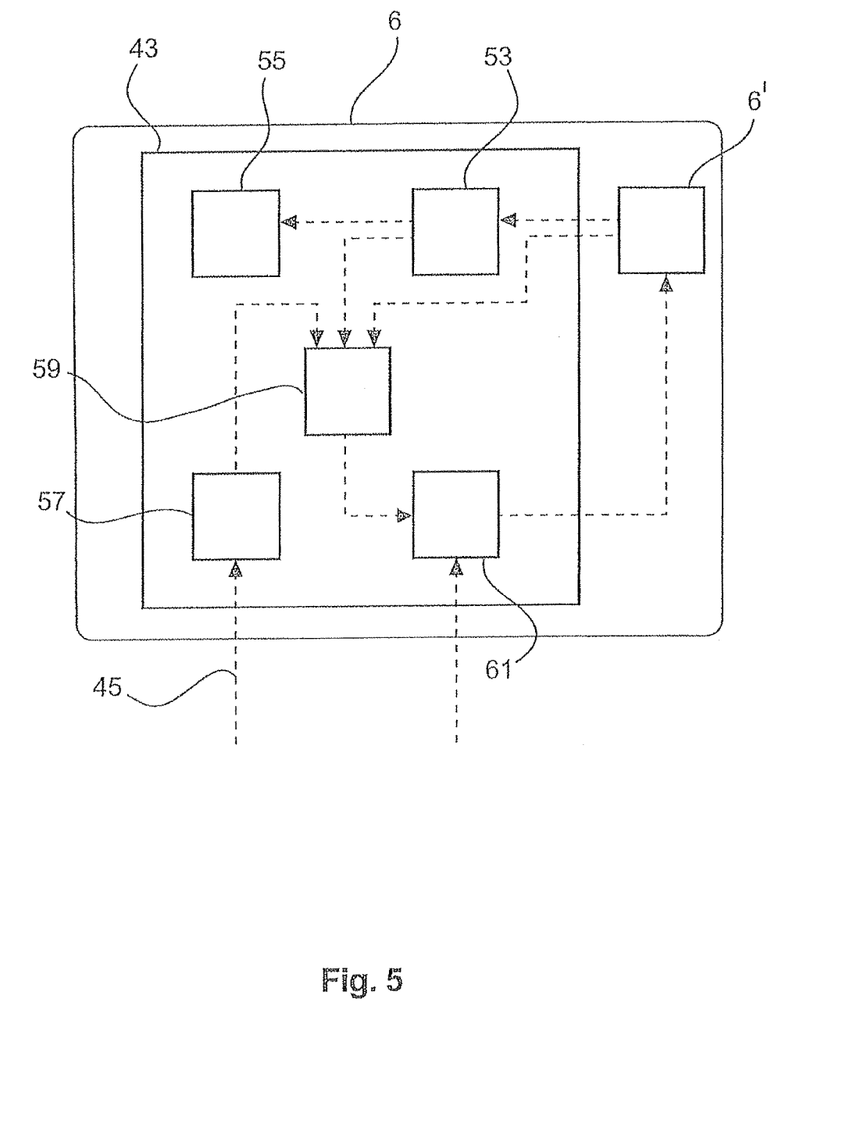
FIG. 5 shows a diagrammatic view of a control unit of an energy supply system according to the present invention.

FIG. 5 shows a diagrammatic partial view of the control unit 6. The control unit 6 includes the arrangement 6' of diesel-electric systems, an operating hours detection unit 53 (OHDU), a maintenance identification unit 55 (MIU), an energy presetting unit 57 (EPU), a system determining unit 59 (SDU), and a switching unit 61 (SU).

In operation of the ship or the energy supply system the OHDU 53 monitors steadily or at regular intervals the operating hours statuses of the diesel-electric systems of the arrangement 6' of diesel-electric systems. If one of the diesel-electric systems of the arrangement 6' has reached a critical value in respect of the number of operating hours the OHDU 53 communicates a corresponding item of information to the MIU 55. The MIU 55 is adapted to produce a warning signal which represents the need for maintenance of the corresponding diesel-electric system. Optionally the MIU 55 is adapted to output the signal optically, acoustically or in the form of analog or digital data transmission. Alternatively the OHDU 53 communicates the operating hours statuses to the MIU 55. When a critical operating hours status of one of the diesel-electric systems (or a plurality of diesel-electric systems) is reached the MIU 55 identifies the need for maintenance of the corresponding diesel-electric system or systems and then produces a warning signal.

The EPU 57 monitors the energy requirement of the on-board network 55 at regular intervals, preferably steadily. The EPU 57 communicates the level of the energy requirement of the on-board network 45 either directly or after conversion into a signal representing that requirement, to the SDU 59. The SDU 59 receives the status about the diesel-electric systems already in operation from the arrangement 6' of diesel-electric systems or alternatively from the OHDU 53. The SDU 59 also receives from the OHDU 53 information as to whether and if in the affirmative which of the diesel-electric systems has already reached a critical operating hours value. The SDU 59 compares the power made available, corresponding to the number of diesel-electric systems in operation, to the required energy of the on-board network 45, communicated by the EPU 57, and on that basis decides whether more energy, less energy or energy which is sufficient at the present time is available or is to be made available to the on-board network 45. If too much energy is made available to the on-board network 45 by the energy supply system 6 the SDU 59 selects how many and which diesel-electric systems of the arrangement 6' are to be shut down. In that situation the SDU 59 also takes into consideration which of the diesel-electric systems are preferably to be shut down, on the basis of their operating hours status.

In the event that too little energy is made available to the on-board network 45 by the energy supply system 6 the SDU 59 selects how many and which diesel-electric systems have to be switched on to provide additional power. In that case also the SDU 59 takes into consideration which diesel-electric systems are preferably switched on and/or preferably remain shut down, on the basis of the operating hours status they have reached. The result of that selection is communicated from the SDU 59 to the SU 61. On the basis of the selection made the SU 61 switches on or shuts down the corresponding diesel-electric systems. Optionally the SU 61 can also be actuated manually for switching on or shutting down given diesel-electric systems. That is symbolically indicated by the arrow 63.

Maintenance of the ship may be implemented in accordance with the following steps:

opening the common opening, and removing the diesel-electric system or systems through the common opening.

Maintenance is further performed by means of the following steps:

releasing the fixing of the diesel-electric system or systems, displacing the diesel-electric system or systems from an operating position into a mounting/removal position, introducing a crane hook through the common opening, fixing one or more diesel-electric systems to the crane hook, removing the diesel-electric system or systems from the interior of the ship, introducing one or more diesel-electric systems into the interior of the ship to the mounting/removal position, releasing and removing the crane hook from the interior of the ship, displacing the diesel-electric system or systems into the operating position thereof, fixing the diesel-electric system or systems, and closing the common opening. Release and displacement of the diesel-electric systems like also fixing and displacement of the diesel-electric systems from the mounting position into the operating position can already be performed while the ship is travelling so that maintenance times and berthing times are minimized.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A ship comprising:
   at least one Magnus rotor that is configured to driven by electrical energy, the at least one Magnus rotor being configured to drive the ship by wind;
   an energy supply system that is configured to supply electrical energy to the at least one Magnus rotor, the energy supply system including a plurality of diesel-electric systems for providing electrical energy, the diesel-electric systems being arranged in an interior portion of the ship;
   a common opening associated with the plurality of diesel-electric systems for removal of the diesel-electric systems; and
   a control unit associated with the energy supply system and configured to:
      detect a number of operating hours each diesel-electric system has operated,
      determine which of the plurality of diesel-electric systems to switch on and off based on the detected number of operating hours that each diesel-electric system has been operating, and
      switch on one or more of the plurality of the diesel-electric systems when the energy requirement is above a threshold value and shut down the one or more of the plurality of the diesel-electric systems when the energy requirement that is below the threshold value, such that a uniform difference in operating hours of each diesel-electric system is maintained.

2. The ship according to claim 1 wherein the diesel-electric systems are movable within the ship between an operating position and a mounting/removal position beneath the common opening.

3. The ship according to claim 2 wherein the diesel-electric systems are displaceable by displacement means.

4. The ship according to claim 3 wherein removable floor panels are arranged above the displacement means.

5. The ship according to claim 1 wherein the diesel-electric systems are configured to be arrested in the operating position by a screw or latch.

6. The ship according to claim 1 comprising a ship crane configured to remove at least one of the diesel-electric systems from the interior of the ship through the common opening and to introduce it into the interior of the ship.

7. The ship according to claim 1 wherein the ship has a plurality of Magnus rotors that are each configured to be rotated by electrical energy provided by the energy supply system.

8. The ship according to claim 7 wherein the energy supply system is configured to supply one or more electric motors for driving the ship's screw and one or more transverse thruster rudders.

* * * * *